Dec. 25, 1956 H. A. BERLINER 2,775,684
COOKING UTENSIL
Filed Jan. 19, 1955
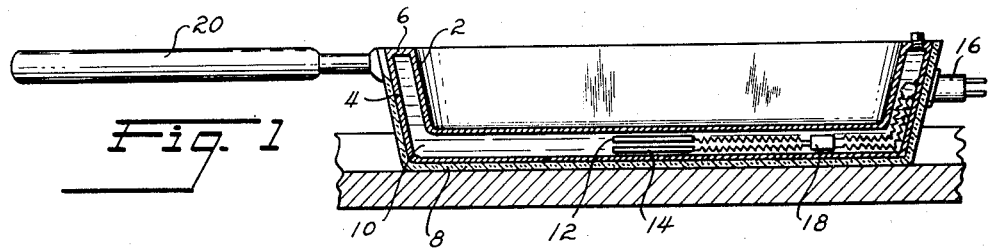
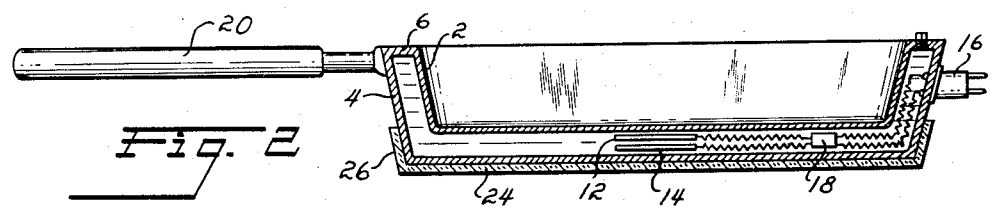
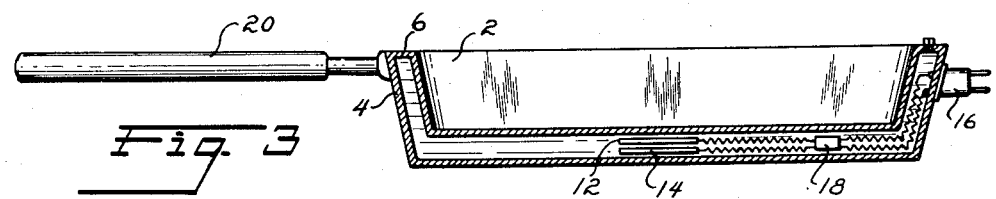
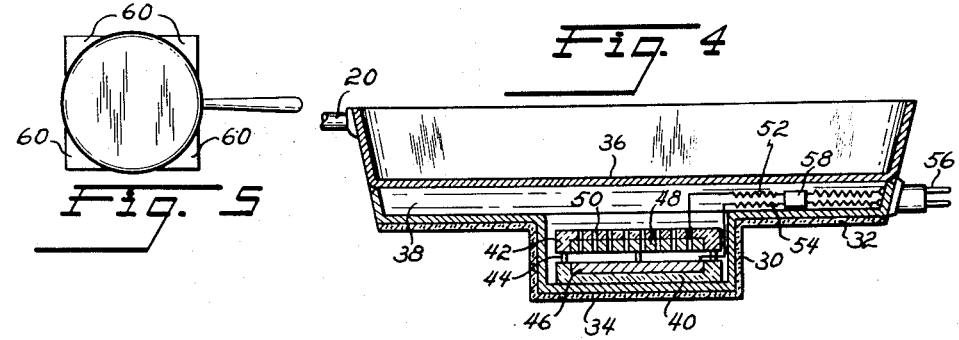
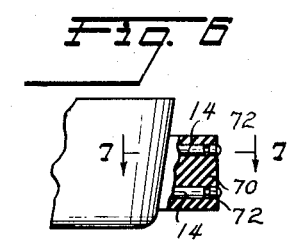
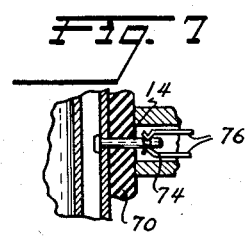
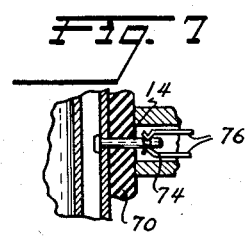
INVENTOR
HENRY A. BERLINER
BY *Scrivener & Parker*
ATTORNEYS United States Patent Office 2,775,684
Patented Dec. 25, 1956

2,775,684

COOKING UTENSIL

Henry A. Berliner, Washington, D. C.

Application January 19, 1955, Serial No. 482,713

2 Claims. (Cl. 219—44)

This invention relates broadly to the cooking of food and, more particularly to cooking utensils such as pans, skillets, saucepans and the like.

In my co-pending application Serial No. 482,712, filed January 19, 1955, I have disclosed a new and improved apparatus for use in the cooking of food, which apparatus broadly comprises a plate on which a cooking utensil having self-contained electrical heating means is supported and a vertical wall having electrical outlet means for the reception of electric contact plugs carried by a cooking utensil supported on the plate. In some of the embodiments of the invention of my co-pending application channels are formed in the plate which supports the cooking utensil, and these channels receive the cooking utensil and guide it to a position in which the contact plugs carried by the utensil are received within the electric outlet means. By the present invention I have provided a new and improved cooking utensil having self-contained electric heating means, which is particularly adapted and intended for use with the cooking apparatus described and claimed in my co-pending application. This new and improved cooking utensil is described in the following specification and illustrated in the accompanying drawings, in which Figs. 1, 2, 3 and 4 are sectional views showing four forms of cooking utensils according to the invention;

Fig. 5 is a perspective view of a cooking utensil having means formed thereon which assist in guiding the utensil in a channel formed in a supporting plate;

Fig. 6 is a part elevational and part sectional view showing a cooking utensil including means for insulating the electric plugs thereof from each other, and Fig. 7 is a view taken on line 7—7 of Fig. 6.

In Fig. 1 there is shown a form of cooking utensil which may be used with the apparatus described in my co-pending application in order to cook food, and this cooking utensil may be a frying pan, sauce pan or other such utensil. This utensil takes the form of a dished receptacle formed of spaced inner and outer shells 2, 4 forming the walls and bottom of the utensil and completely enclosing the space between them, which is further enclosed by the upper horizontal annular wall 6 which connects the upper edges of the inner and outer shells. A layer of insulation 8 completely covers the outer surface of the utensil in order that heat generated in the enclosed space will not be transmitted to the supporting surface 12 on which the utensil is supported, or to the side walls 14 of a guideway for the utensil which may be formed in such surface. The space enclosed by the walls 2, 4, 6 is substantially filled with an ionizable liquid 10, which, when passing current, generates and conducts heat, and immersed within this liquid are two spaced electrodes 12, 14, which are preferably carbon discs, which are electrically connected to two electric plugs 16 which are mounted externally of the cooking utensil and are adapted to be received in electric outlet sockets associated with the supporting apparatus described and claimed in my co-pending application. A temperature regulator 18 is associated with the heating elements 12, 14 and is constructed and operable to disconnect the heating elements from the source of electric energy when the temperature of the ionizable liquid reaches a pre-determined cooking temperature. A handle 20 is connected to the cooking utensil in the usual and conventional manner.

If desired, the exterior insulation may cover the bottom and only the lower part of the exterior of the side wall of the cooking utensil and such an embodiment of my invention is illustrated in Fig. 2, in which the bottom layer of insulation is designated by numeral 24 and the side wall insulation by numeral 26. It is also contemplated that there may be no exterior insulation at all and such an embodiment of my invention is disclosed in Fig. 3.

In certain embodiments of the invention disclosed in my co-pending application the plate which supports the cooking utensil has formed therein narrow channels or guideways which receive a downwardly extending part on the bottom of the cooking utensil, which part is narrower than the utensil whereby the utensil is guided along the channel to a position in which the outlet plugs carried by the utensil are received within the electric sockets associated with the supporting plate. In Fig. 4 of the drawings of this application there is disclosed a cooking utensil having such a downwardly extending part 30 which is preferably formed integrally with the bottom 32 of the utensil and which is preferably of rectangular shape in horizontal cross section whereby its sides will engage the sides of one of the guideways or channels in face to face relation in order that the cooking utensil will be properly positioned as the downward extension 30 is moved along the channel. An external layer of insulation 34 may be provided over the entire exterior surface of the bottom 32 and the downwardly extending part 30. The cooking utensil disclosed in Fig. 4 may have a false bottom 36 which is spaced upwardly above the bottom wall 32 thus providing an entirely enclosed space 38 which contains an ionizable liquid having the characteristics described above. Within the downwardly extending part 30 there is disposed a preferred means for heating the ionizable liquid within the chamber 38, it being understood of course that the interior of the downwardly extending part 30 is in full communication with the space 38 and forms part thereof. This heating means comprises two cup-shaped receptacles 40, 42 which are arranged one above the the other with their open sides facing, and the two being permanently connected in spaced relation by connecting pins 44. These receptacles are formed of porcelain or other electrically insulating material. Within the lower receptacle 40 there is positioned a carbon disk 46 and within the upper receptacle 42 there is positioned a second carbon disk 48, the two disks being spaced apart and being supported in their respective receptacles by any suitable means. The upper carbon disk 48 and its supporting receptacle 42 are provided with a plurality of aligned openings 50 extending entirely through the disk and the receptacle and which permit circulation of liquid from the space between the two carbon disks to the space above the upper disk 48 and receptacle 42. The two carbon disks are connected by leads 52, 54 to external electric contact plugs 56 which are permanently mounted on the exterior of the cooking utensil, and a temperature control device 58 may be included in the connection between the carbon disks and the outlet plugs.

In the use and operation of the cooking utensil disclosed in Fig. 4, the downwardly extending part 30 is positioned within one of the narrow guideways or channels formed in a supporting plate, as described and claimed in my co-pending application, and the utensil is then moved toward the electric socket means associated with the plate, the downwardly extending part 30 providing a means for positioning and guiding the utensil within and along the channel. When the downwardly extending part 30 reaches the end of the channel the plugs 56 will be received within the electric outlet sockets associated with the plate and aligned with the channel in which the part 30 is positioned. When this occurs, electric energy will be supplied to the spaced carbon disks 46, 48 and the ionizable liquid therebetween will conduct electric energy between the two disks, thereby heating the liquid. The passages 50 through the upper disk 48 and its supporting receptacle 42 will permit circulation of the heated liquid from the space between the two disks to the space 38 below the bottom wall 36 on which the food is supported.

In certain embodiments of the invention disclosed in my co-pending application the guideways or channels formed in the plate which supports the cooking utensils are of such width that the entire utensil may be positioned therein. A circular cooking utensil may, of course, be used with such a channel or guideway and in such a case it may be desirable to provide on such a circular cooking utensil some means which will position the utensil within the guideway so that the plugs carried by the utensil will be guided directly to the electric outlet sockets associated with the supporting plate. Such means are disclosed in Fig. 5 and comprise four ears or lugs 60 which may be permanently attached to the exterior of the side walls of the cooking utensil, adjacent the bottom thereof, and which are spaced at 90° intervals about the utensil and together form a rectangle which will engage the parallel side walls of the channel or guideway.

It is desirable to isolate the contact plugs 14, which are mounted on the cooking utensil, from each other in order to prevent water or grease from bridging them and causing a short circuit. This may be accomplished by entirely surrounding the plugs with a body 70 of compressible rubber or other electrically insulating material which is attached to the cooking utensil and which has holes 72 therethrough within which the plugs are positioned. Such a structure is disclosed in Fig. 6 in its uncompressed state and in Fig. 7 in its compressed state, which it assumes when the plugs are pushed into the electric socket means. The body 70 will, of course, be formed of a material which will not absorb or retain water, grease or other liquid or other material. When compressed, the body 70 will exert a force tending to move the cooking utensil away from the wall in which the electric outlet sockets are positioned and means are provided by the invention to counteract this force. In the embodiment of the invention disclosed in the drawings, such means may take the form of grooves or depressions 72 formed in one or both of the contact plugs, which have a snap engagement with resilient arms 74 carried by the wall member.

It is believed that the use and operation of the various embodiments of the invention which are described and illustrated herein will be fully understood by those skilled in the art and that no further explanation thereof is required.

While I have described and illustrated certain forms which my invention may take, it will be apparent to those skilled in the art that other embodiments, as well as modifications of those disclosed, may be made and practiced without departing in any way from the spirit or scope of the invention, for the limits of which reference must be made to the appended claims.

What is claimed is:

1. A cooking utensil comprising vertically spaced bottom walls, a side wall attached to the peripheries of the bottom walls to define an enclosed chamber therebetween and extending above the upper bottom wall to provide a side for the utensil, the lower bottom wall having at its central part a hollow downwardly extending part defined by side walls and a bottom and the interior of which is open to the enclosed chamber between the bottom walls, a liquid substantially filling said downwardly extending part and said enclosed chamber which when passing electric current generates and conducts heat, two dish shaped receptacles formed of electrically non-conductive material arranged in vertically spaced relation in said downwardly extending part with their open sides facing each other, means supporting said receptacles in spaced relation to each other, a disk of electrically conductive material supported in each of said spaced receptacles, electric contact plugs mounted on the side wall of the utensil, and leads connecting said disks to said contact plugs.

2. A cooking utensil according to claim 1, in which the upper receptacle and the disk supported therein have a plurality of openings therethrough to permit circulation of the liquid.

References Cited in the file of this patent

UNITED STATES PATENTS

| | | |
|---|---|---|
| 896,838 | Klein | Aug. 25, 1908 |
| 2,081,537 | Hanks | May 25, 1937 |
| 2,164,813 | Gunther | July 4, 1939 |
| 2,189,127 | Brannon | Feb. 6, 1940 |
| 2,236,837 | Rimmel | Apr. 1, 1941 |
| 2,430,196 | Vaughan | Nov. 4, 1947 |

FOREIGN PATENTS

| | | |
|---|---|---|
| 150,673 | Great Britain | Sept. 29, 1921 |